Patented Nov. 20, 1923.

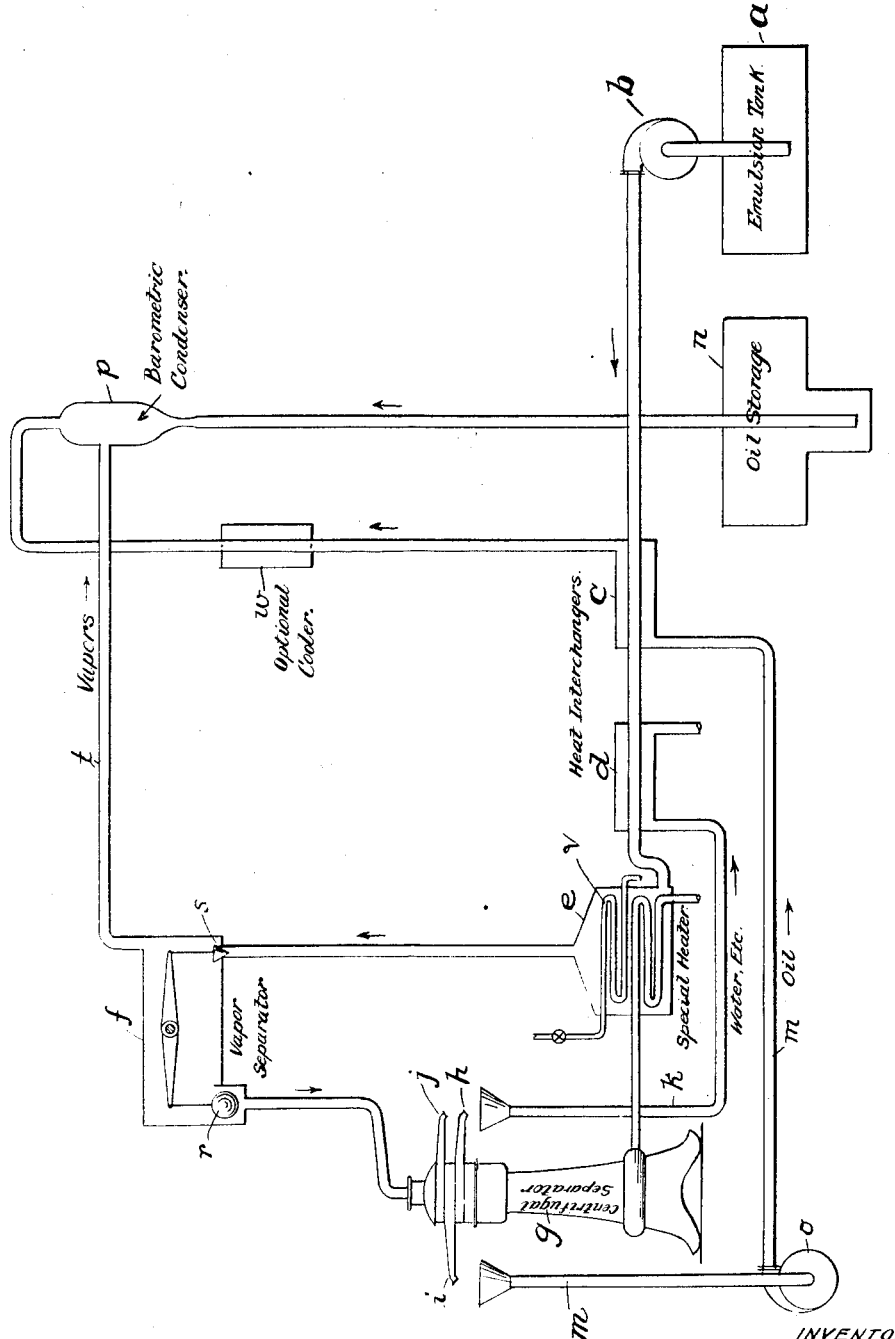

UNITED STATES PATENT OFFICE.

SELDEN H. HALL, OF POUGHKEEPSIE, NEW YORK, ASSIGNOR TO THE DE LAVAL SEPARATOR COMPANY, OF NEW YORK, N. Y., A CORPORATION OF NEW JERSEY.

PROCESS FOR PURIFYING LIQUIDS.

Application filed August 16, 1921. Serial No. 492,849.

*To all whom it may concern:*

Be it known that I, SELDEN H. HALL, a citizen of the United States, residing at Poughkeepsie, county of Dutchess, and State of New York, have invented a new and useful Improvement in Processes for Purifying Liquids, of which the following is a full, clear, and exact description, reference being had to the accompanying drawings, which form a part of this specification.

This invention relates to processes for purifying liquids, especially by the use of centrifugal force, to avoid loss of any volatile constituents which they may contain. The process is especially applicable to the treatment of mineral oil. The product of some oil wells consists partly or entirely of an emulsion of oil, water, dirt, etc., of high viscosity. One process for recovery of oil from such emulsions is to heat the emulsion so as to reduce its viscosity and pass it through a centrifugal separator. While being heated and centrifuged, and especially at the instant of escape from the centrifugal bowl in a finely divided spray, there is a great loss by evaporation of the more volatile, and in many cases the most valuable, constituents. The object of my invention is to prevent this great loss. The process, however, is equally applicable to any liquid containing valuable volatile constituents whose retention is necessary or desirable and contaminating ingredients, liquid or solid, whose removal is to be effected.

The process is not dependent for its execution on any particular apparatus. To clarify an explanation of the process I have, however, illustrated, diagrammatically, a workable apparatus in which the process may be economically and effectively carried out.

*a* is a tank for the emulsion to be treated; *b* a pump; *c* a heat interchanger with one passage for oil to be treated and an adjacent passage for treated oil; *d* a similar heat interchanger with one passage for oil to be treated and an adjacent passage for waste water, etc., discarded by the treatment; *e* an oil heater; *f* a vapor separating tank; and *g* a centrifugal separator. The separator has three outlets: *h* for water and other impurities, *i* for oil, and *j* for overflow in case the feed is greater than the separator can properly care for. A pipe *k* is provided to carry away water, etc., from the separator. A pipe *m* is provided to carry purified oil from the separator to a storage tank *n*. Interposed in the pipe *m* is a pump *o* and a barometric condenser *p*.

The bottom of tank *f* is divided into two compartments, one shallow and of large area, and the other deeper and of small area. In the deeper compartment there is a float *r* which, when it rises, closes a valve *s* on the inlet to the tank. A pipe *t* provides connection from the tank *f* to the condenser *p*.

In operation, the emulsion is pumped from the tank *a* through the heat interchanger *c* where it is warmed by the outcoming finished oil, and then through the heat interchanger *d*, where it is further heated by the waste water, etc., removed by the treatment. The warmed oil then passes into the heater *e* where it receives the heat from the exhaust steam from the turbine driven separator *g*. If the oil is not hot enough for best results, a coil *v* heated by live steam may be placed in the top of this heater. This heater should preferably have a conical top to facilitate escape of any gases generated therein.

The highly heated oil then passes to the vapor separating tank *f*, spreads out in a thin layer over the bottom of the large compartment and flows over a weir into the deep compartment. If the oil begins to come in faster than it is taken away, the float *r* rises and closes the valve *s* so as to shut off the supply. The pressure in the tank *f* is kept much less than atmospheric, which causes a rapid escape of all gases from the thin layer of oil. The height of the tank *f* above the separator *g* is such that the column of oil in the connecting pipe will overcome the vacuum in the tank and cause a pressure greater than atmospheric at the separator. The vapors that escape from the oil in the tank *f* pass through the pipe *t* to the condenser *p*.

The separator receives the emulsion, separates it, and discharges the water and impurities from the spout *h* into the pipe *k* leading to the heat interchanger *d*, where its heat is given up to the incoming oil. The cleaned oil escapes at the spout *i* into the pipe *m* and is forced by the pump *o* through the heater interchanger *c*, where it is cooled by the incoming oil, and then to the top of the barometric condenser *p*. In the condenser the cooled oil is brought into intimate contact with the gases, condenses and absorbs them and carries them far enough below the surface of the oil in the storage tank n to cause a pressure sufficiently high to give the maximum possible absorption.

If the cooling in the heat interchanger p is not sufficient to cause in the condenser a complete condensation and absorption of the gases, an additional cooler w may be interposed between the heat interchanger o and the condenser p.

Having now fully described my invention, what I claim and desire to protect by Letters Patent is:—

1. The process of treating a mixture comprising a liquid containing volatile constituents and a contaminating ingredient to separate said liquid without loss of volatile constituents, which comprises heating the mixture from an outside source of heat, withdrawing the generated volatile gases from a body of said heated liquid and thereby maintaining said body at a pressure less than atmospheric, subjecting the heated mixture to centrifugal force and separating said contaminating ingredient, effecting an exchange of heat between the outgoing products of centrifugation and the mixture before the latter is subjected to the heating hereinbefore specified, and bringing the cooled purified liquid into contact with said volatile gases.

2. The process of purifying liquids containing valuable volatile constituents which comprises subjecting the liquid to conditions tending to cause vaporization and escape of volatile constituents, centrifugally purifying the remaining liquid, and bringing the purified liquid into contact with the vapors under conditions tending to cause reabsorption of the volatile constituents.

3. The process of purifying liquids containing valuable volatile constituents which comprises heating the liquid and driving off volatile constituents, centrifugally purifying the remaining liquid, cooling the purified liquid, and reabsorbing the volatile constituents in the cooled purified liquid.

4. The process of purifying liquids containing valuable volatile constituents which comprises heating the liquid, withdrawing the gases generated by said heat from a body of said heated liquid and thereby maintaining its pressure at less than atmospheric, centrifugally purifying the liquid, cooling the purified liquid, and then bringing the cooled purified liquid into contact with the gases so as to condense and reabsorb them.

5. The process of treating a mixture comprising a liquid containing volatile constituents and a contaminating ingredient to separate said liquid without loss of its volatile constituents, which comprises heating the mixture and driving off volatile constituents as vapors, subjecting the heated mixture to centrifugal force to eliminate the contaminating ingredient from the liquid, effecting an exchange of heat between the outgoing purified liquid and said mixture before heating the mixture, and bringing the cooled purified liquid into contact with said vapors.

6. The process of treating a mixture comprising a liquid containing volatile constituents and a contaminating ingredient to separate said liquid without loss of its volatile constituents, which comprises separating the liquid with its volatile constituents from said contaminating ingredient, subjecting the mixture about to be separated to a plurality of heating operations, one by bringing it into heat exchange relation with both outgoing products of centrifugation and the other by heat from an outside source, thereby driving off volatile constituents from the mixture before centrifugation, and bringing the liquid which has been separated by centrifugation and cooled by heat discharge into contact with said vapors.

7. The process of purifying liquids containing valuable volatile constituents which comprises heating the liquid, flowing the heated liquid over a relatively large surface to form a shallow body to cause rapid escape of vapors, discharging the liquid from said body, regulating the flow of liquid to and from said body to maintain a minimum depth of liquid, centrifugally purifying the liquid discharged from said body, and bringing said liquid into contact with said vapors under conditions tending to reabsorb them.

In testimony of which invention, I have hereunto set my hand, at Poughkeepsie, on this twelfth day of July, 1921.

SELDEN H. HALL.